Aug. 20, 1968     D. W. ANDERSON     3,398,323
DISTRIBUTION TRANSFORMER HAVING SECONDARY BREAKER
Filed Jan. 12, 1966
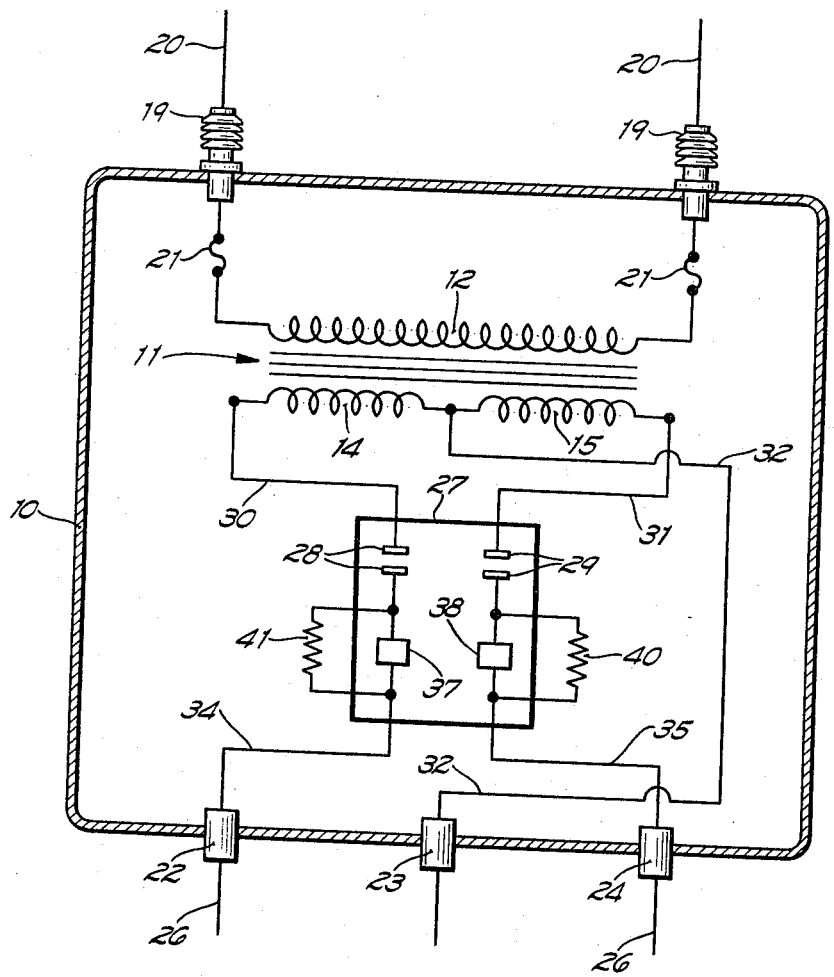
INVENTOR.
David W. Anderson
BY
Charles Gundell
Attorney

United States Patent Office

3,398,323
Patented Aug. 20, 1968

3,398,323
DISTRIBUTION TRANSFORMER HAVING SECONDARY BREAKER
David W. Anderson, Zanesville, Ohio, assignor to McGraw-Edison Company, Milwaukee, Wis., a corporation of Delaware
Filed Jan. 12, 1966, Ser. No. 520,274
4 Claims. (Cl. 317—15)

ABSTRACT OF THE DISCLOSURE

An arrangement for protecting the secondary winding of a transformer from overload current. The coils in each section of the secondary winding are connected together so that the total current from each winding section can be divided by a resistor connected in shunt with a temperature responsive element. When the portion of the current passing through the temperature responsive element attains an overload value, the element will actuate a breaker to interrupt the current.

---

This invention relates to electrical power distribution transformers and more particularly to means for protecting such transformers from damage caused by sustained overloads.

In order to assure long life for a distribution transformer, it should be protected against overload which might unduly hasten the end of its life. Primary protective links are used to remove the transformer from the line if a fault occurs in the transformer, and low-voltage internal circuit breakers are used to protect the secondary and to remove faulted secondary mains. The breaker consists of a bimetal in series with movable contacts submerged in oil within the transformer tank and connected in the secondary winding so that the low-voltage current flows through the breaker and the temperature rise of the breaker is determined by the temperature rise of the oil and the current flowing through the breaker. In many distribution transformers having a circuit breaker for interrupting the secondary circuit, the secondary winding comprises a pair of groups of winding sections and each group comprises a pair of the winding sections connected in parallel so that only half of the total secondary current flows through the bimetals. The contacts of the circuit breaker are so located in the secondary circuit that they will interrupt the total current instead of only the fraction flowing through the bimetals. Although this arrangement permits reduction in the size of the bimetal elements, the secondary coils must be so wound that the secondary current divides equally in the parallel winding sections, and this requirement adds materially to the cost of coil construction. Such pair or groups of paralleled winding sections is considerably more complicated and expensive than conventional secondary winding arrangements so that it necessitates center taps in the windings, a greater number of leads and connections, a greater amount of labor, and the use of relatively expensive small size conductor.

It is an object of the invention to provide a self-protected transformer having a circuit breaker for interrupting the secondary circuit including bimetal elements which are heated both in accordance with the oil temperature and the current flowing in the transformer secondary and wherein it is not necessary to wind the secondary coils so that the secondary current divides equally between them and wherein the bimetal elements carry only a fraction of the total secondary current. It is a further object of the invention to provide such a self-protected transformer which obviates the necessity of center tops in the secondary windings and greatly simplifies and lowers the cost of constructing the secondary winding.

This and other objects and advantages of the invention will be more readily apparent from the following detailed description when considered in conjunction with the single figure of the accompanying drawing which is a circuit diagram of a single phase distribution transformer embodying the invention.

Referring to the drawing, an electrical distribution transformer includes a casing 10 enclosing a core and coil assembly including a magnetic core 11 linked by a primary winding 12 and a secondary winding having two coils 14 and 15 electrically joined together. The core and coil assembly is submerged in a suitable insulating dielectric such as transformer oil within casing 10. The primary winding 12 is connected through insulating bushings 19 to the conductors 20 of an alternating current power line, and fusible links 21 may be provided between primary winding 12 and the bushings 19 to remove the transformer from the power line if a fault occurs within the transformer. Three secondary insulating bushings 22, 23 and 24 on casing 10 may be connected to distribution circuit conductors 26.

A circuit breaker 27 submerged in the oil within casing 10 has a two-pole switch represented by the circuit interrupting contact members 28 and 29 that are mechanically gauged to operate together. Bimetal elements 37 and 38 are provided for actuating the circuit breaker 27.

A conductor 30 connects one end of secondary coil 14 to one switch contact 28, and a conductor 31 connects one end of secondary coil 15 to one switch contact 29. A conductor 32 connects the junction of secondary coil 14 and 15 to the conductive stud of secondary insulating bushing 23. The other switch contact member 28 is connected to bimetal 37, and a conductor 34 connects bimetal 37 to secondary bushing 22. The other switch contact 29 is connected to bimetal element 38, and a conductor 35 connects bimetal element 38 to insulating bushing 24.

A resistance shunt 40 is connected in parallel to bimetal element 37, and a resistance shunt 41 may be connected in parallel to bimetal element 38, and the resistance of shunts 40 and 41 are selected so that the secondary currents flowing in the bimetals 37 and 38 are approximately equal. Only half of the total secondary current flows through each of the bimetal elements 37 and 38, thereby permitting the bimetal elements to be of reduced size. The bimetal elements 37 and 38 are submerged in the transformer oil and constitute thermally actuated load responsive elements for initiating the operation of the current breaker 27 to open the switch contact members 28 and the switch contact members 29 to disconnect the transformer secondary winding from the distribution circuit conductors 26. The bimetal elements 37 and 38 are responsive to both the temperature of the transformer oil and the secondary current flowing therethrough, and either bimetal 37 or 38 is effective to trip the circuit breaker 27 and interrupt the current through both poles of the circuit breaker and thus disconnect the secondary winding from the distribution circuit conductors 26.

If the transformer is of the core type, the secondary coils 14 and 15 are preferably wound on different winding legs of the magnetic core 11. The secondary coils 14 and 15 need not be wound so that the secondary coils themselves determine equal division of current through the bimetal elements 37 and 38 since this is accomplished by the shunts 40 and 41. The transformer secondary winding may have fewer winding sections than the pair of groups of paralleled winding sections required in known self-protected transformers, no center taps are required, fewer leads and connections are needed, and larger size, less expensive conductor such as aluminum strip may be utilized in constructing the secondary coils. Further, the reduced number of winding sections decreases the amount of labor required in constructing the transformer secondary winding.

While only a single embodiment of the invention has been illustrated and described, many modifications and variations thereof will be readily apparent to those skilled in the art, and consequently it is intended in the appended claims to cover all such modifications and variations which are within the true spirit and intent of the invention.

I claim:

1. In combination, an electrical transformer comprising a casing, three secondary terminals on said casing, a dielectric fluid within said casing, a circuit breaker in said casing including two pairs of contact members and a pair of temperature responsive elements each of which is immersed in said dielectric fluid and is operative to trip the circuit breaker, inductively linked primary and secondary windings submerged in said dielectric fluid within said casing, said secondary winding including a pair of secondary coils electrically connected with each other in series only, said coils each having an end individually connected to one of said secondary terminals in a secondary current path through one of said pair of current breaker contact members and one of said temperature responsive elements, and impedance means connected in shunt to at least one of said temperature responsive elements for causing approximately equal magnitudes of current to flow in said secondary current paths.

2. The combination according to claim 1 wherein impedance means are connected in shunt to both of said temperature responsive elements and each of said impedance means shunts a portion of the current flowing in a secondary current path around a temperature responsive element.

3. The combination according to claim 1 wherein said secondary current paths each comprise a series circuit through one of said current breaker contact members and one of said temperature responsive elements and said secondary coils each have another end connected together to form said series connection, each of said other ends also being connected to the remaining one of said secondary terminals.

4. The combination according to claim 3 wherein said temperature responsive elements each comprise a bimetallic element.

References Cited

UNITED STATES PATENTS

| | | | |
|---|---|---|---|
| 1,504,193 | 8/1924 | Treanor | 317—15 |
| 1,988,683 | 1/1935 | Diehl | 317—15 |
| 2,597,185 | 5/1952 | Roeding et al. | 317—14 |
| 2,823,338 | 2/1958 | Edsall | 317—40 X |

LEE T. HIX, *Primary Examiner.*

J. D. TRAMMELL, *Assistant Examiner.*